United States Patent [19]

Reed et al.

[11] Patent Number: 4,792,453
[45] Date of Patent: Dec. 20, 1988

[54] HARD COATED SUGARLESS CHEWING GUM

[75] Inventors: Michael A. Reed, Evanston; Mansukh M. Patel, Downers Grove; Vasek J. Kures, Willow Springs, all of Ill.

[73] Assignee: Wm. Wrigley Jr. Company, Chicago, Ill.

[21] Appl. No.: 46,665

[22] Filed: May 4, 1987

[51] Int. Cl.$^4$ .............................................. A23G 3/30
[52] U.S. Cl. .................................... 426/5; 426/658; 426/548; 426/660; 426/302; 426/303; 426/804
[58] Field of Search ...................................... 426/3–5, 426/548, 804, 658, 660, 302, 303

[56] References Cited

U.S. PATENT DOCUMENTS

| | | | |
|---|---|---|---|
| 4,117,173 | 9/1978 | Schiweck et al. | 426/658 |
| 4,317,838 | 3/1982 | Cherukuri et al. | 426/5 |
| 4,323,588 | 4/1982 | Vink | 426/660 |
| 4,359,531 | 11/1982 | Bucke et al. | 426/658 |
| 4,423,086 | 12/1983 | Devos et al. | 426/548 |
| 4,567,053 | 1/1986 | Lindley | 426/658 |
| 4,587,119 | 5/1986 | Bucke et al. | 426/3 |
| 4,693,974 | 9/1987 | Schwengers et al. | 426/548 |

FOREIGN PATENT DOCUMENTS 273000 6/1988 European Pat. Off. ............. 426/5

OTHER PUBLICATIONS

"Palatinit–INFOPAC", Palatinit GmbH, date of publication unknown.
Coating Data Literature, Palatinit GmbH, date of publication unknown.

*Primary Examiner*—Jeanette Hunter
*Attorney, Agent, or Firm*—Willian Brinks Olds Hofer Gilson & Lione Ltd.

[57] ABSTRACT

A sugarless hard coated chewing gum comprising a sugarless chewing gum center and a sugarless hard coating containing hydrogenated isomaltulose. The chewing gum center has a low water content, preferably less than about 2.5 weight percent based on the weight of the gum center. The sugarless hard coated chewing gum is manufactured by applying to the chewing gum center a sugarless syrup comprising hydrogenated isomaltulose to coat the gum centers. The coated gum centers are then dried in an inert medium such as air to form the hard coating.

47 Claims, No Drawings

HARD COATED SUGARLESS CHEWING GUM

FIELD OF THE INVENTION

The present invention relates to an improved hard coated sugarless chewing gum.

BACKGROUND OF THE INVENTION

Sugarless chewing gums are frequently enclosed with hard or soft coatings. Coatings provide an opportunity for the manufacturer to vary product characteristics such as taste, appearance and nutritional value. In recent years, efforts have been devoted to producing sugarless hard coatings for chewing gum. In today's health conscious society, gums containing sugarless sweeteners are popular confectionary items. In response to this consumer demand, the industry has investigated sugarless coatings containing compounds such as xylitol, sorbitol, mannitol, and hydrogenated starch hydrolysates. These sugarless compounds contain sweetening characteristics but are devoid of common known sugars such as sucrose, dextrose, fructose, glucose, and equivalent products.

Hard coatings containing sorbitol are common in the art. Sorbitol is generally acceptable because of its availability and the low cost. Sugarless gums coated with sorbitol, however, suffer from deficiencies. For example, sorbitol coating solutions are difficult to employ in the coating process. In addition, sorbitol coated products are usually rough, contain colored spots or blotches, and are waxy. Furthermore, because of its hygroscopicity, sorbitol dries and crystallizes slowly. Thus, sorbitol coated products are often rejected by consumers in favor of sugar coatings because of their rough and mottled appearance and lack of crunchiness.

Accordingly, a need currently exists in the confectionary market place for a sugarless gum with a hard coating which possesses the appealable characteristics of a sugar coating. To satisfy consumers, the coating would ideally be identical in appearance, taste, and mouth feel to a sugar coating. To satisfy the manufacturers, the coating would be high in stability, easy to apply and economical.

It is therefore an object of the present invention to provide a novel and improved sugarless hard coated chewing gum. It is a further object of the present invention to provide a sugarless hard coating for a sugarless chewing gum which compares to the appearance, mouth feel, stability, and ease of application of sugar hard coatings. It is a further object of the present invention to provide a method for applying such a sugarless coating to a sugarless chewing gum center.

SUMMARY OF THE INVENTION

In accordance with the present invention, a sugarless hard coated chewing gum comprising a sugarless chewing gum center and a sugarless hard coating is provided. The chewing gum center contains water in an amount less than about 2.5 weight percent based on the weight of the center. The hard coating comprises hydrogenated isomaltulose, preferably in an amount between about 50 to about 100 weight percent of the coating.

The present invention further provides a sugarless hard coated chewing gum comprising a sugarless chewing gum center and a sugarless hard coating containing hydrogenated isomaltulose wherein the gum center comprises in admixture an insoluble gum base, a bulking agent, and a softener. The softener, prior to being admixed to form the gum center, contains water in an amount of less than about 30 weight percent.

Further in accordance with the present invention, there is also provided a method of manufacturing a sugarless hard coated chewing gum. The method involves applying to a sugarless chewing gum center which has a water content of less than about 2.5 weight percent, a sugarless syrup comprising hydrogenated isomaltulose. The hydrogenated isomaltulose preferably constitutes about 50 to about 75 weight percent of the syrup. Once applied, the coated gum center is dried in an inert medium such as air under drying conditions sufficient to form a hard coated chewing gum.

DETAILED DESCRIPTION OF PREFERRED EMBODIMENTS

It has now been discovered that when a sugarless chewing gum center is coated with a syrup comprising hydrogenated isomaltulose in accordance with the present invention, a novel sugarless hard coated chewing gum is obtained. The gum center is preferably employed in a pelletized or tablet form. The center may comprise various substituents including water, an insoluble gum base, a bulking agent, a softener, an artificial sweetener, and a flavoring agent.

In accordance with the present invention, the sugarless gum center should have a very low water content. Preferably, the gum center will have a water content of less than about 2.5 weight percent, more preferably less than about 1.5 weight percent, and most preferably less than about 1.0 weight percent. Without being limited to theory, it is believed that a low water gum center when combined with a coating syrup comprising hydrogenated isomaltulose yields a superior hard coating because the center will not be a water donor to the completed coating.

In general, a chewing gum composition comprises a water soluble portion and a gum base portion. The water soluble portion dissipates over a period of time by chewing while the gum base portion is insoluble and is retained in the mouth throughout chewing.

The insoluble portion of the gum center or gum base generally comprises a resilient elastomeric component which may be either natural or synthetic or a combination thereof. In addition, resinous components are also included in the gum center. In general, the elastomers provide the insoluble portion of the gum center with resiliency while the resin provides a uniform mouth feel. Gum base ordinarily comprises substantially insoluble natural bases such as chicle alone or in combination with synthetic polymers such as polyvinyl acetate, polyisobutylene rubbers and the like. According to the present invention, the insoluble gum base constitutes between about 5 to 95 weight percent of the gum center. Preferably the insoluble gum base comprises about 10 to about 50 weight percent of the gum center and more preferably about 25 weight percent.

The gum center often also includes a bulking agent or filler component. The bulking agent generally comprises inert, inorganic compound such as calcium carbonate, magnesium carbonate, talc, and the like, or inert organic compounds such as waxes and the like, alone or in combination. Those skilled in the art will recognize that bulking agents or fillers may also be included as a portion of the gum base. The bulking agent may constitute between about 5 to about 95 weight percent of the gum center. Preferably, the bulking agent comprises about 5 to about 50 weight percent of the gum center.

The soluble portion of the gum center may further comprise softeners, sweeteners and/or flavoring agents. Softeners are added to the gum center in order to optimize the chewability and mouth feel of the gum. softeners, also known in the art as plasticizers or plasticizing agents, generally constitute between about 0.5 to about 15 weight percent of the chewing gum center. Softeners contemplated by the present invention include glycerine, glycerol monostearate, acetylated monoglycerides, lecithin, vegetable oils, and combinations thereof. Further, aqueous sweetener solutions such as those containing sorbitol, hydrogenated starch hydrolysates, corn syrup and combinations thereof may be combined with the above compounds.

In accordance with one embodiment, the present invention contemplates the softener as a major water source for the gum center. Thus, the amount of water associated with the softener is low. Preferably, prior to its admixture with the other gum center constituents, the softener will have a water content of less than about 30 weight percent. When the softener contains a combination of compounds, the total water content is preferably less than about 30 weight percent of the combined softener constituents. Thus, for example, if glycerine and a sorbitol solution are combined as the softener, the total water contributed to the gum base from these two compounds is less than about 30 weight percent of their combined weight. More preferably, the softener or combination of compounds comprising the softener will possess a total water content of less than about 20 weight percent of the softener.

Sugarless sweeteners contemplated by the present invention include components with sweetening characteristics but devoid of the commonly known sugars. Sugarless sweeteners comprise but are not limited to sugar alcohols such as sorbitol, mannitol, xylitol, hydrogenated starch hydrolysates, and the like, alone or in any combination. Also contemplated as sugarless sweeteners are maltitol, isomalt, or any high intensity sweetener such as aspartame, salts of acesulfame, alitame, saccharin and its salts, cyclamic acid and its salts, dihydrochalcones, thaumatin, sucrose derivatives such as sucralose, monellin, and the like, alone or in any combination. Further, those skilled in the art will recognize that the sugarless sweetener may be present in the chewing gum in whole or in part as a water soluble bulking agent. In addition, the softener may be combined with the sugarless sweetener such as in an aqueous sweetener solution.

A flavoring agent may be present in the sugarless gum center in an amount within the range of from about 0.5 to about 10.0 weight percent and preferably from about 0.5 to about 3.0 weight percent of the gum center. The flavoring agent may comprise essential oils, synthetic flavors, or mixtures thereof including but not limited to oils derived from plants and fruit such as citrus oils and fruit essences. Other oils contemplated as flavoring agents include peppermint oil, spearmint oil, clove oil, oil of wintergreen, anise, fruit flavors, and the like. Those skilled in the art will recognize that these and similar oils, and any combinations thereof are contemplated by the present invention which is not limited to any particular flavoring agent.

The present invention further contemplates that the sugarless chewing gum comprise hard coating comprising hydrogenated isomaltulose. The hard coating may be present as a single coating or as a plurality of layers. In addition, the coating may be present in any thickness or amount which is commercially acceptable. Preferably, the coating is present in the range of about 10 to about 75 weight percent and more preferably about 20 to about 50 weight percent of the coated chewing gum.

Hydrogenated isomaltulose, also known as isomalt, is a sugar substitute which can be used in place of sucrose, glucose, or similar sugars for the production of food stuffs. Hydrogenated isomaltulose may be classified as a carbohydrate and more specifically, a hydrogenated disaccharide.

Hydrogenated isomaltulose is available from Palatinit GmbH under the trademark name palatinit. According to the manufacturer, the production of hydrogenated isomaltulose involves an enzymatic rearrangement of saccharose into a much more stable compound known as isomaltulose (trademark name palatinose). Following a purifying crystallization, the isomaltulose is hydrogenated to form the resulting palatinit compound. Specifically, palatinit is an equimolecular mixture of the isomers $\alpha$-D-glucopyranosido-1,6-mannitol (GPM) and $\alpha$-D-glucopyranosido-1,6-glucitol (GPG). Palatinit is described as an odorless, white, crystalline, nonhygroscopic substance containing about 5 percent water of crystallization.

The present invention contemplates a coating comprising hydrogenated isomaltulose, preferably between about 50 to about 100 weight percent. More preferably, the coating will contain greater than about 80 weight percent hydrogenated isomaltulose. Hydrogenated isomaltulose is believed to be a superior sugarless sweetener in a gum hard coating because of its relatively high sweetening power, lack of aftertaste and synergistic capabilities when mixed with other sugar alcohols such as xylitol or sorbitol.

The coating may also contain other components such as flavoring agents, artificial sweeteners and dispersing agents, coloring agents, film formers, and binding agents. Flavoring agents contemplated by the present invention include those commonly known in the art and already discussed herein. The flavoring agents may be added to the coating syrup in an amount such that the coating will contain about 0.2 to about 1.2 weight percent and preferably about 0.7 to about 1.0 weight percent flavoring agent.

Artificial sweeteners contemplated by the present invention include those substances already mentioned herein including but not limited to synthetic substances, saccharin, thaumatin, alitame, saccharin salts, aspartame, and acesulfame-K. The artificial sweetener may be added to the coating syrup in an amount such that the coating will contain about 0.05 to about 0.3 weight percent and preferably about 0.10 to about 0.15 weight percent artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain between about 0.1 to about 1.0 weight percent and preferably 0.3 to about 0.6 weight percent of the agent.

Coloring agents are preferably added directly to the syrup in the dye or lake form. Coloring agents contemplated by the present invention include food quality dyes. Film formers preferably added to the syrup, include methyl cellulose gelatins, hydroxypropyl cellulose, ethyl cellulose, hydroxyethyl cellulose, carboxmmethyl cellulose and the like and combinations thereof. Binding agents may be added either as an initial coating on the chewing gum center or may be added directly into the syrup. Binding agents contemplated by the present invention include alginate, cellulosic, vegetalle gums and the like.

The present invention further provides a method for manufacturing a sugarless hard coated chewing gum which comprises applying to the chewing gum center a syrup comprising hydrogenated isomaltulose. In general, the hard coating process is carried out in a rotating pan. Sugrrless gum center tablets to be coated are placed into the rotating pan to form a moving mass. The material or syrup which will eventually form the hard coating, is applied or distributed over the gum center tablets. Flavoring agents may be added before, during and after applying the syrup to the gum centers. Once the coating has dried to a hard surface, additional syrup additions may be made to produce a plurality of coatings or multiple layers of hard coating.

In the hard coating panning procedure, syrup is added to the gum center tablets at a temperature range of about 100° F. to about 200° F. Preferably, the syrup temperature is between about 150° F. to about 170° F. Most preferably, the syrup temperature should be maintained at about 158° F. throughout the process in order to prevent the hydrogenated isomaltulose in the syrup from crystallizing. The syrup may be mixed with, sprayed upon, poured over, or added to the gum center tablets in any way known to those skilled in the art.

The gum center tablets may be coated with a single hard layer or a plurality of hard layers. In general, a plurality of layers is obtained by applying single coats, allowing the layers to dry, and then repeating the process. Any number of coats may be applied to the gum center tablet. Preferably, no more than about 75 coats are applied to the gum center tablets. More preferably, less than about 60 coats are applied and most preferably, between about 30 to about 60 coats are applied. In any event, the present invention contemplates applying an amount of syrup sufficient to yield a hard coated chewing gum product containing about 10 to about 75 weight percent coating. Preferably, the final product will contain between about 20 to about 50 weight percent coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure. In any event, the present invention contemplates applying a coat or plurality of coats sufficient to yield a product containing about 10 to about 75 weight percent coating.

The present invention contemplates that the syrup preferably comprises between about 30 weight percent hydrogenated isomaltulose and its saturation point at coating temperatures. More preferably, the syrup will contain about 60 to about 75 weight percent hydrogenated isomaltulose. The syrup may comprise hydrogenated isomaltulose dissolved in water or any other food quality solvent in an amount sufficient to yield a hard coating comprising between about 50 to about 100 weight percent hydrogenated isomaltulose. More preferably, however, the syrup will comprise an amount of hydrogenated isomaltulose sufficient to yield a hard coating comprising greater than about 90 weight percent hydrogenated isomaltulose. Furthermore, the syrup and thus the coating may contain sugar substitutes other than hydrogenated isomaltulose such as sorbitol, mannitol and xylitol.

In addition, it is contemplated by the present invention that a flavoring agent may be added to the syrup, or applied to the gum center tablets while the syrup coating is drying or after the coating has dried. Furthermore, the flavoring agent may be applied after any sequence of coats, for xxample, the third, twelfth, eighteenth, etc. coat.

Once a coating of syrup is applied to the gum center tablets, the present invention contemplates drying the wet syrup in an inert medium. A preferred drying medium comprises air. Preferably, forced drying air contacts the wet syrup coating in a temperature range of about 80° to about 115° F. More preferably, the drying air is in the temperature range of about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate of about 2800 cubic feet per minute. Furthermore, if a flavoring agent is applied after a syrup coating has been dried, the present invention contemplates drying the flavoring agent with or without the addition of a drying medium.

The following example is not to be construed as a limitation upon the present invention, but is included merely as an illustration of one embodiment of the present invention.

EXAMPLE

A sugarless hard coated chewing gum was prepared in accordance with the present invention. A sugarless chewing gum center was prepared by mixing an insoluble base with calcium carbonate, glycerine, and an aqueous sorbitol solution. This admixture was then combined with sorbitol over a short period of time. A high intensity sweetener, encapsulated acesufame-K was then added to the admixture. The encapsulant employed was a fluid bed coated zein. Those skilled in the art, however, will readily understand that the invention is not limited by any encapsulation technique. Finally, a peppermint flavoring agent was added and the components were mixed to substantial homogenity. The composition of the chewing gum center was as follows:

| Component | Weight Percent |
| --- | --- |
| Base | 33.0 |
| Sorbitol | 41.95 |
| Calcium Carbonate | 13.0 |
| Glycerine (96%) | 6.0 |
| Aqueous Sorbitol Solution (70%) | 4.0 |
| Peppermint Flavor | 1.8 |
| Acesufame-K | 0.25 |
| | 100.0 |

A coating syrup containing 73 weight percent hydrogenated isomaltulose, 24 weight percent water and 3 weight percent TiO$_2$ slurry (1:1 TiO$_2$:H$_2$O) was prepared by blending the components and heating to boiling. After the components were dissolved, the syrup was allowed to cool to approximately 160° F.

Fifty kilograms of the chewing gum centers were placed in a 38 inch hard coating pan which was rotated at about 21 RPM. Those skilled in the art will recognize that any standard copper, stainless steel, or side vented type pan may be employed in the process of the present invention. Standard pans include those which are available from suppliers such as Dumouline Co., Pelligrini Co., Driam Co., and the like. Thus, the skilled artisan will understand that any coating system commonly used to perform confectionary coating may be employed in the process of the present invention. The syrup was applied portionwise to the chewing gum centers rotating in the pan over a period of approximately 4 hours according to the schedule in Table 1. Sixty milliliters (60 ml) of peppermint flavoring agent was applied on the eighth, thirteenth, and eighteenth coatings. Upon drying, the sugarless hard coated chewing gum was comparable in appearance and mouth feel to chewing gums containing hard sugar coatings.

TABLE 1

| Application | Application Quantity (Ladles) 1 Ladle = 1 pt | Drying Time (min.) |
|---|---|---|
| 1 | ½ | 3 |
| 2 | ½ | 3 |
| 3 | ½ | 3 |
| 4 | ¾ | 3 |
| 5 | ¾ | 3 |
| 6 | ¾ | 4 |
| 7 | ¾ | 4 |
| 8* | 1 | 4 |
| 9 | 1 | 4 |
| 10 | 1 | 4 |
| 11 | 1 | 5 |
| 12 | 1½ | 5 |
| 13* | 1½ | 5 |
| 14 | 2 | 5 |
| 15 | 2 | 5 |
| 16 | 2 | 5 |
| 17 | 2 | 5 |
| 18* | 2 | 5 |
| 19 | 2 | 5 |
| 20 | 2 | 5 |
| 21 | 2 | 5 |
| 22 | 2 | 5 |
| 23 | 2 | 5 |
| 24 | 2 | 5 |
| 25 | 2 | 5 |
| 26 | 2 | 5 |
| 27 | 2 | 5 |
| 28 | 2 | 5 |
| 29 | 2 | 5-6 |
| 30 | 2 | 5-6 |
| 31 | 2 | 5-6 |
| 32 | 2 | 5-6 |
| 33 | 2 | 5-6 |
| 34 | 2 | 5-6 |
| 35 | 2 | 5-6 |
| 36 | 2 | 5-6 |
| 37 | 2 | 5-6 |
| 38 | 2 | 5-6 |
| 39 | 2 | 5-6 |
| 40 | 1 | 6 |
| 41 | 1 | 6 |
| 42 | 1 | 6 |

Total coating time: 3.75 hours.
*60 ml of flavor agent applied on coats 8, 13 and 18.

We claim:

1. A hard coated sugarless chewing gum comprising a sugarless chewing gum center and a sugarless hard coating comprising hydrogenated isomaltulose, said gum center having a water content of less than about 2.5 weight percent based on the weight of the gum center.

2. The gum of claim 1 wherein the coating comprises hydrogenated isomaltulose and other coating ingredients and the hydrogenated isomaltulose constitutes greater than about 50 weight percent of the coating.

3. The gum of claim 1 wherein the coating comprises hydrogenated isomaltulose and other coating ingredients and the hydrogenated isomaltulose constitutes greater than 90 weight percent of the coating.

4. The gum of claim 1 wherein the coating further contains a flavoring agent.

5. The gum of claim 1 wherein the coating further contains an artificial sweetener.

6. The gum of claim 1 wherein the coating further contains a dispersing agent.

7. The gum of claim 6 wherein the dispersing agent comprises titanium dioxide.

8. The gum of claim 1 wherein the coating constitutes about 10 to about 75 weight percent of the coated chewing gum.

9. The gum of claim 1 wherein the chewing gum center has a water content of less than about 1.5 weight percent.

10. The gum of claim 1 wherein the chewing gum center has a water content of less than about 1.0 weight percent.

11. The gum of claim 1 wherein the chewing gum center comprises an insoluble gum base.

12. The gum of claim 1 wherein the insoluble gum base constitutes between about 5 to about 95 weight percent of the chewing gum center.

13. The gum of claim 1 wherein the chewing gum center further comprises a bulking agent.

14. The gum of claim 13 wherein the bulking agent constitutes between about 5 to about 95 weight percent of the chewing gum center.

15. The gum of claim 13 wherein the bulking agent comprises a sweetener.

16. The gum of claim 13 wherein the bulking agent comprises sorbitol, mannitol, hydrogenated isomaltulose, xylitol, maltitol, hydrogenated starch hydrolysate, or combinations thereof.

17. The gum of claim 15 wherein the sweetener comprises sorbitol.

18. The gum of claim 1 wherein the gum center further comprises a softener.

19. The gum of claim 18 wherein the softener constitutes between about 0.5 to about 15.0 weight percent of the chewing gum center.

20. The gum of claim 18 wherein the softener comprises glycerine.

21. The gum of claim 18 wherein the softener comprises an aqueous sweetener solution.

22. The gum of claim 21 wherein the aqueous solution comprises sorbitol, hydrogenated starch, hydrolysates, corn syrup, or combinations thereof.

23. The gum of claim 18 wherein the softener contains less than about 30 weight percent water.

24. The gum of claim 1 wherein the chewing gum center further comprises a flavoring agent.

25. The gum of claim 1 wherein the chewing gum center further comprises an artificial sweetener.

26. A sugarless hard coated chewing gum comprising a sugarless chewing gum center and a sugarless hard coating containing hydrogenated isomaltulose, said gum center comprising in admixture an insoluble gum base, a bulking agent and a softener, said softener having a water content less than about 30 weight percent.

27. The gum of claim 26 wherein said softener comprises glycerine, sorbitol, glycerols, glycerides, lecithin, vegetable oils, aqueous sweetener solutions or combinations thereof.

28. A method of manufacturing a sugarless hard coated chewing gum which comprises applying to a sugarless chewing gum center which has a water content of less than about 2.5 weight percent a sugarless syrup comprising hydrogenated isomaltulose to obtain a coated gum center and drying the coated gum center under drying conditions to form said sugarless hard coated chewing gum.

29. The method of claim 28 wherein the syrup temperature is between about 100° to about 200° F.

30. The method of claim 28 wherein the syrup composition comprises between about 60 to about 75 weight percent hydrogenated isomaltulose.

31. The method of claim 28 wherein the syrup composition further comprises a dispersing agent.

32. The method of claim 28 wherein the syrup composition further comprises an artificial sweetener.

33. The method of claim 28 wherein the syrup composition further comprises a flavoring agent.

34. The method of claim 28 wherein the syrup is applied by spraying.

35. The method of claim 28 wherein the coated gum is dried in forced air at a temperature range of about 90° F. to about 150° F.

36. The method of claim 35 wherein the drying air has a relative humidity of less than about 15 percent.

37. The method of claim 35 wherein the drying conditions include an air flow rate of about 2800 ft$^3$/min.

38. The method of claim 28 further comprising applying a flavoring agent to the coated chewing gum.

39. The method of claim 35 further comprising applying a flavoring agent to the coated chewing gum and the agent is dried in the absence of forced air.

40. The method of claim 28 wherein a plurality of coatings are applied to the chewing gum center.

41. The method of claim 40 wherein about 30 to about 60 coats are applied.

42. The method of claim 40 wherein a flavoring agent is applied during at least two of the plurality of coatings.

43. The method of claim 28 wherein the coating is applied to the chewing gum center in an amount sufficient to constitute about 10 to about 75 weight percent of the coated chewing gum.

44. The method of claim 28 wherein the chewing gum center comprise an insoluble gum base.

45. The method of claim 28 wherein the chewing gum center comprises sorbitol, mannitol, isomalt, xylitol, maltitol, sucralose, hydrogenated starch hydrolysates, or combinations thereof.

46. The method of claim 28 wherein the chewing gum center comprises glycerine.

47. The method of claim 28 wherein the chewing gum center comprises a flavoring agent.

* * * * *

UNITED STATES PATENT AND TRADEMARK OFFICE
CERTIFICATE OF CORRECTION

PATENT NO. : 4,792,453
DATED : December 20, 1988
INVENTOR(S) : Michael A. Reed et al.

It is certified that error appears in the above-identified patent and that said Letters Patent is hereby corrected as shown below:

In column 3, lines 6-7, please delete "softeners" and substitute therefor --Softeners--.

In column 5, lines 4-5, please delete "carboxmmethyl" and substitute therefor --carboxymethyl--.

In column 5, line 9, please delete "vegetalle" and substitute therefor --vegetable--.

In column 5, line 16, please delete "sugrrless" and substitute therefor --sugarless--.

In column 6, line 14, please delete "xxample" and substitute therefor --example--.

Signed and Sealed this

Thirtieth Day of July, 1991

Attest:

HARRY F. MANBECK, JR.

Attesting Officer

Commissioner of Patents and Trademarks